United States Patent

Higashida et al.

[15] 3,703,612

[45] Nov. 21, 1972

[54] SINGLE TAKE-UP REEL, AUTOMATIC THREADING, MAGNETIC TAPE DUPLICATING APPARATUS

[72] Inventors: Yutaka Higashida, Nishinomiya; Kaoru Imanishi, Osaka, both of Japan

[73] Assignee: Matsushita Electric Industrial Co., Ltd., Osaka, Japan

[22] Filed: March 16, 1970

[21] Appl. No.: 19,944

[30] Foreign Application Priority Data

| | | |
|---|---|---|
| March 25, 1969 | Japan | 44/24512 |
| March 25, 1969 | Japan | 44/28859 |
| March 26, 1969 | Japan | 44/27442 |
| July 9, 1969 | Japan | 44/66831 |

[52] U.S. Cl. ............................179/100.2 E, 242/192

[51] Int. Cl. ..........................G11b 5/86, G11b 15/66

[58] Field of Search........179/100.2 E; 242/180, 181, 242/192, 195; 226/190, 191, 196

[56] References Cited

UNITED STATES PATENTS

| | | | |
|---|---|---|---|
| 3,420,460 | 1/1969 | Tatter et al. | 179/100.2 |
| 3,393,878 | 7/1968 | Aweida et al. | 242/182 |
| 3,526,406 | 9/1970 | Blackie et al. | 242/180 |
| 2,891,736 | 6/1959 | Blaes | 242/192 |
| 2,867,692 | 1/1959 | Camras | 179/100.2 E |

OTHER PUBLICATIONS

Sugaya et al., Magnetic Tape Duplication by Contact Printing at Short Wavelengths, IEEE Transactions on Magnetics, Vol. MAG–, No. 3, Sept. 1969, pp. 437–441.

*Primary Examiner*—Stanley M. Urynowicz, Jr.
*Assistant Examiner*—Robert S. Tupper
*Attorney*—Stevens, Davis, Miller & Mosher

[57] ABSTRACT

A magnetic tape duplicating apparatus of the type in which a recorded master tape and an unrecorded slave tape are taken up on a take-up reel with the magnetic coatings of the respective tapes in intimate contact with each other and a transfer bias magnetic field is impressed on both tapes on the take-up reel thereby to transfer a signal on the recorded master tape onto the unrecorded slave tape, wherein a device is provided for automatically engaging the master tape and the slave tape around the take-up reel at the outset of the tape winding operation, so as to enhance the efficiency of the tape duplicating operation.

6 Claims, 11 Drawing Figures

Y. HIGASHIDA
AND
K. IMANISHI
INVENTORS

BY Stevens, Davis, Miller & Mosher
ATTORNEY

SINGLE TAKE-UP REEL, AUTOMATIC THREADING, MAGNETIC TAPE DUPLICATING APPARATUS

The present invention relates to an apparatus for duplicating a magnetic tape by contact transfer.

Conventional apparatus used in the contact transfer of a magnetic tape are generally of the type shown in FIG. 1. Referring to FIG. 1, reference numeral 1 designates a recorded master tape supply reel and 7 designates an unrecorded slave tape supply reel. A master tape 5 and a slave tape 6 are supplied from the respective supply reels 1 and 7, with their magnetic coating layers confronting each other, and after passing on a transfer field generator 11 in close contact with each other while being guided by guide posts 3 and 4, are taken up on take-up reels 2 and 8 respectively.

A signal recorded on the master tape 5 is transferred onto the slave tape 6 by a high frequency magnetic field generated by the transfer field generator 11, when these tapes pass on said transfer field generator with the magnetic coating layers of the respective tapes in intimate contact with each other. The apparatus of the type described, however, has the disadvantage that both tapes must be fed at exactly the same speed and maintained in the lapped state in precise registration with each other, over a predetermined distance of travel, because even a slight difference in speed between both tapes will result in a substantial reduction in transfer effect. Another disadvantage is that, since the transfer is effected by feeding the tapes at a considerably high speed, an air layer tends to be formed between the tapes, which makes intimate contact of the tapes difficult. The formation of such an air layer is particularly detrimental to the transfer operation itself. Because of the foregoing problems, it has been believed that the practical use of the contact transfer system is difficult.

In order to solve such problems, the present inventors have previously proposed a novel bifiler tape winding system as shown in FIG. 2. Referring to FIG. 2, a recorded master tape 5 and an unrecorded slave tape 6, supplied from supply reels 1 and 7 respectively, are driven by a capstan 12, with the magnetic coating layers of said respective tapes in close contact with each other, and led to a take-up reel 13. The take-up reel 13 is mounted on a supporting rod 16 which is pivotable about a pivot point 17. Furthermore, the supporting rod 16 is biased by a spring 19 in a direction to urge the take-up reel 13 against the capstan 12, which spring is anchored to a pin 18 at one end thereof. Thus, it will be understood that the laminate 14 of both tapes, taken up on the take-up reel 13, is pressed against the capstan 12 and, therefore, air is completely purged from between both tapes at the time of winding and an extremely tight contact of the tapes can be obtained. Transfer of a signal from the recorded tape to the slave tape is effected on the take-up reel 13 by the transfer magnetic field generated by a transfer field generator 15. Namely, it can be considered that both tapes are held stationary relative to each other when the transfer is effected, and hence the problem of speed difference between the tapes is completely eliminated.

Because of such advantages as set forth above, the system is particularly effective for use in the transfer of a signal of short wave length. However, since the operation of taking up the master tape 5 and the slave tape 6 on the take-up reel 13 involves a great difficultly, as will be appreciated from FIG. 2, the system used heretofore requires a long time for the operation and is not adaptable to the mass production of copied tapes.

With the recent prevalence of video tape recorders and electronic computers, the demand for duplication of a large quantity of tapes for such equipments is increasing. However, the conventional head-to-head duplicating system is unsatisfactory because it is not adapted to high speed duplication, whereas the conventional contact transfer system, shown in FIG. 1, has not been put in practical use due to the various problems as described above. The novel bifiler tape winding system shown in FIG. 2 has made it possible to duplicate a tape of high quality and at a high speed, but by applying the present invention to the apparatus of FIG. 2, it becomes possible to simplify the operation, to automatize the tape engaging operation, to shorten the duplication time and thereby to produce copied tapes in large quantities.

Furthermore, according to the present invention it is not necessary to connect a special leader tape to the leading end of a master tape. Therefore, there is the advantage that the master tape will not be damaged even after repeated use.

Other objects, features and advantages of the present invention will be readily apparent from the following detailed description of certain preferred embodiments taken in conjunction with the accompanying drawings, in which.

Figure 1:
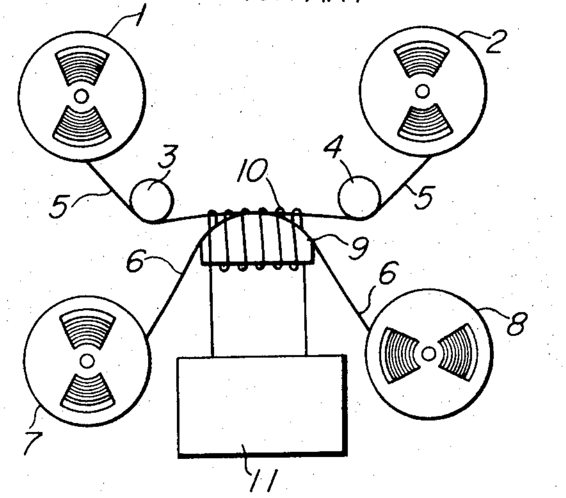
FIG. 1 PRIOR ART
FIG. 1 is a plan view showing briefly a conventional transfer apparatus.
Figure 2:
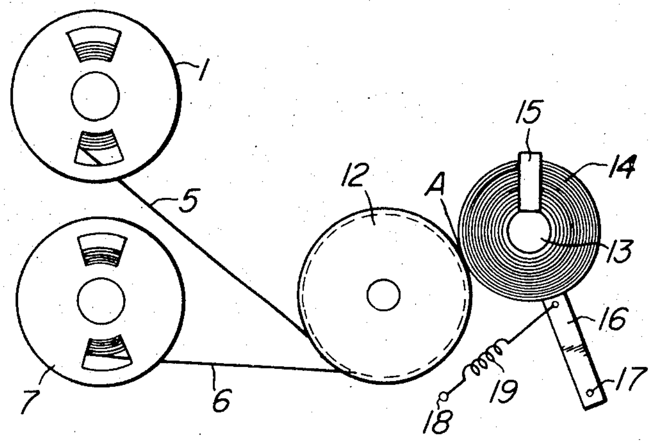
FIG. 2 is a plan view showing the first embodiment of the present invention.

The present invention is concerned with improvements in the magnetic tape transfer apparatus described above with reference to FIG. 2, and the apparatus of the invention is so constructed that the leading ends of the recorded master tape 5 and the unrecorded slave tape 6 are automatically secured to the take-up reel 13, instead of being manually secured by the operator.

Figure 3:
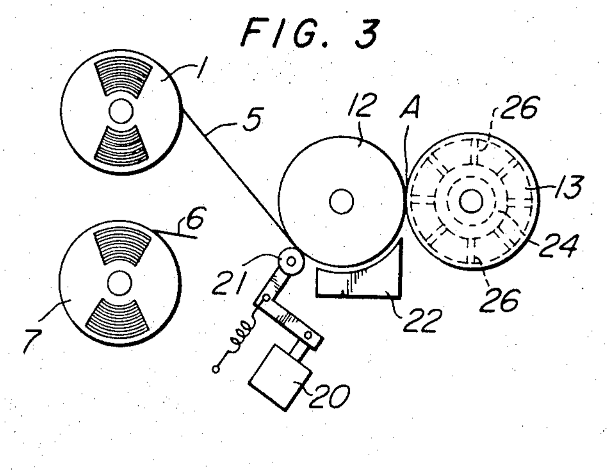
FIG. 3 is a plan view showing the second embodiment of the invention.

First of all, the manner of setting the master tape will be explained hereunder:

As shown in FIG. 3, a pinch roller 21 is provided near the location where the master tape 5 is brought into contact with the capstan 12. The pinch roller 21 can be brought into or out of engagement with the capstan 12 by the action of electromagnetic means 20. A guide 22 is provided extending over a length of the tape from a point A where the capstan 12 and the tape 14 on the take-up reel 13 are in contact with each other to the point of engagement between said pinch roller 21 and the capstan 12.

Figure 4:
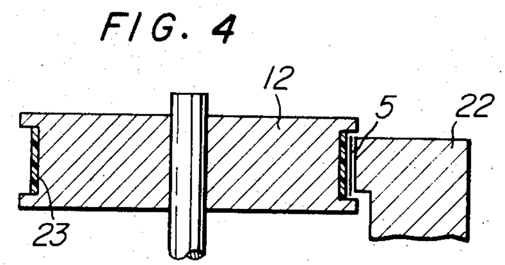
FIG. 4 is a cross-sectional side view showing the principal portion of the embodiment shown in FIG. 3.

The cross-sectional shapes of the capstan 12 and the guide 22 are exemplified in FIG. 4. Namely, the capstan 12 has an annular groove formed in the peripheral surface thereof to restrict a widthwise displacement of the tape by the upper and lower edges of said groove, and the guide 22 is received in the groove to prevent disengagement of the tape from said groove. The width of the annular groove is slightly larger than the width of the tape and the inside surface of the groove is coated with a layer, for example, of rubber or synthetic resin, tightly attached thereto by baking or an equivalent method, so as to create large friction between said coating layer and the tape and thereby to facilitate the driving of tape and maintain the tape 14 in a tight condition.

Figure 5:
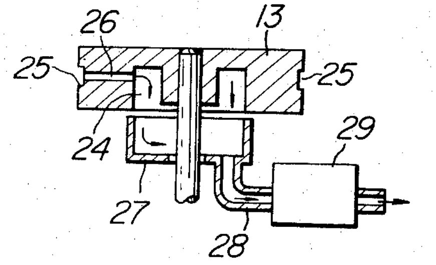
FIG. 5 is a view showing an example of the structure of the take-up reel.
Figure 6:
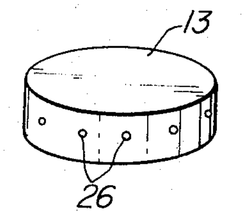
FIG. 6 is a prespective view of the take-up reel shown in FIG. 5.

An example of the structure of the take-up reel 13 is shown in FIG. 5. As shown, the take-up reel 13 is provided with an annular recess 24 at the central portion of the back side thereof and also provided with an annular groove 25 in the peripheral surface thereof, and said annular recess 24 and said annular groove 25 are communicated with each other through a plurality of radial channels 26. Below the take-up reel 13 is provided an air guide 27 which is open at one side for communication with the annular recess 24 of the take-up reel 13. The air guide 27 is connected to an air pump 29 through a duct 28. Incidentally, the air guide 27 is not rotatable. Instead of providing the annular groove 25, the radial channels 26 may be bored directly from the peripheral surface of the take-up reel 13 at short intervals between each other as shown in FIG. 6 (said intervals being perferably not larger than 2.5 cm according to the experimental result, though variable depending upon the output of the air pump 19).

With the arrangement described, when the leading end of the master tape 5 is inserted into the nip between the capstan 12 and the pinch roller 21 in engagement therewith, the master tape 5 is driven by the coaction of said capstan and said pinch roller, and the leading end thereof is led to the contacting point A between the take-up reel 13 and the capstan 12, while being guided by the guide 22. The air pump 29 is actuated at this point, to suck the air interior of the air guide 27, whereupon the master tape 5, having been led to the point A, is sucked into the annular groove 25 of the take-up reel 13 and thus lapped around said take-up reel. The air pump 29 is required to be operated only for a duration in which the master tape 5 is lapped at least one turn around the take-up reel 13.

Figure 7:
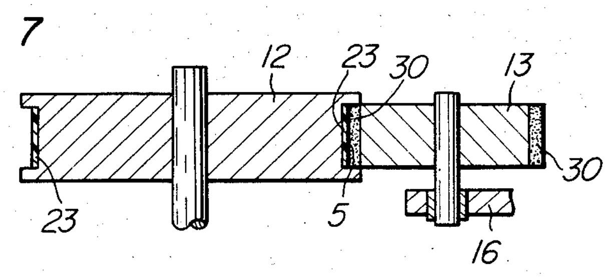
FIG. 7 is a view showing another example of the structure of the take-up reel.

Another example of the take-up reel 13 will be explained with reference to FIG. 7. According to this example, the take-up reel 13 consists of a hub having the peripheral surface thereof coated with a layer 30 of a material which is somewhat tacky to but does not transfer to the magnetic tape. As the non-transferring tacky material, the compounds obtained in the following Examples have prooved satisfactory through the experiments.

EXAMPLE 1

After kneading silicone rubber for 5 minutes at normal temperature, 0.3 PHR of benzoyl peroxide was added to the silicone rubber as vulcanizer and blended therewith for 5 minutes by means of a roll. The silicone rubber with the benzoyl peroxide thus blended therein was charged in a metal mold and vulcanized therein for 15 minutes at 120° C. (under a pressure of 30 $kg/cm^2$). The resultant silicone rubber ring was subject to heat treatments in air, at 150° C. for 1 hour, at 200° C. for 1 hour and at 250° C. at 16 hours, to obtain a non-transferring tacky ring.

EXAMPLE 2

After kneading 500 g. of raw chloroprene rubber for 10 minutes by a hot roll heated at 60° C., a vulcanizer composition consisting of 25 g. of zinc flower, 20 g. of magnesia and 10 g. of phenyl($\beta$)naphthylamine, 75 g. of tackifier consisting of malonic resin and 100 g. of filler consisting of calcium silicate were added to and thoroughly mixed with said chloroprene rubber. The blend thus obtained was charged in a metal mold and vulcanized for 50 minutes at a pressure of 10 $kg/cm^2$ and a temperature of 155° C., to obtain a non-transferring tacky ring.

EXAMPLE 3

300 g. of polysulfide (Thiokol CP-3) was sufficiently stirred with 10 g. of diethylenetriamine added thereto. 100 g. of epoxy resin (Epikote 828) was added to the mixture and the resultant mixture was poured into a metal mold and cured for 2 hours at 70° C., whereby a non-transferring tacky ring was obtained.

By constructing the take-up reel 13 as described above, the leading end of the tape 5, having been led to the contacting point A of said take-up reel and the capstan 12, is adhered to the non-transferring tacky layer 30 of the take-up reel 13 and taken up on said take-up reel.

Figure 8:
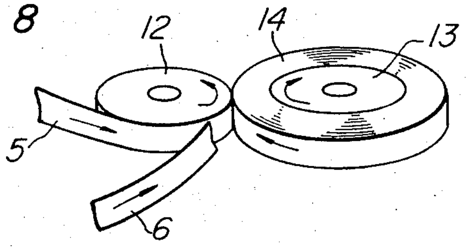
FIG. 8 is a perspective view for explaining the operation of the present invention.

Next, the manner of charging the slave tape 6, after the master tape 5 has been lapped around the take-up reel 13 in the manner described above, will be explained hereinafter:

Referring to FIG. 3, the leading end of the slave tape 6 is inserted into the nip between the pinch roller 21 and the capstan 12 (precisely speaking, the leading end of the tape is stuck into the nip between the pinch roller 21 and the master tape on the capstan 12). Then, the apparatus is set in operation, whereupon the slave tape 6 is driven by the coaction of the capstan 12 and the pinch roller 21 in pressure contact therewith and the leading end of the tape is let to the contacting point A between said capstan 12 and the take-up reel 13 while being guided by the guide 22. At the point A, the slave tape 6 is pinched between the master tape 14 on the reel 13 and the master tape on the capstan 12 as shown in FIG. 8, and thereafter taken up on the reel 13 successively, together with the master tape. The pinch roller 21 is not particularly needed after the tapes have been taken up on the take-up reel 13 in a certain quantity.

Upon completion of the taking-up operation, the transfer field generator 15 is energized to impress a predetermined intensity of transfer field on both tapes and thereby the transfer of signal from the master tape to the slave tape is accomplished. Thereafter, the both tapes are re-wound on the respective supply reels 1 and 7. If, in this case, the arrangement is made such that the master tape still remains on the take-up reel 13 upon completion of rewinding of the slave tape 6 (the copied tape to be precise in an accurate sense), it will be possible to again wind a new slave tape together with the master tape automatically in the manner described, only by replacing the copied tape with the said new slave tape.

Figure 9:
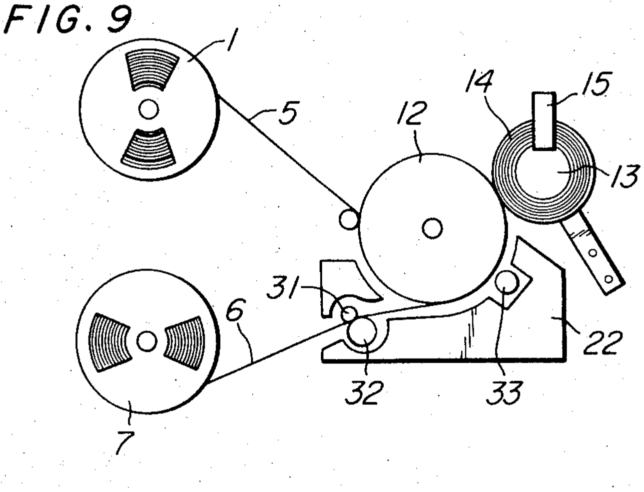
FIG. 9 is a plan view showing the third embodiment of the invention.

Another embodiment of the present invention is shown in FIG. 9. In this embodiment, a capstan 31 and a co-operating pinch roller 32 are provided, instead of the pinch roller 21 in the preceding embodiment, at a location before the unrecorded slave tape engages the capstan 12, said capstan 31 being driven only when the unrecorded slave tape is to be charged. Reference numeral 33 designates another pinch roller which is provided in the guide 22 for pressure engagement with the capstan 12. In this case, it is recommendable that the width of pressure engagement between the capstan 31 and the pinch roller 32 be made smaller than the width of pressure engagement between the capstan 12 and the pinch roller 33.

Another capstan, similar to the capstan 31, may of course be provided along the path of the master tape 5, for use in the charging of the master tape. It is also possible to utilize the same capstan 31 for the charging of the master tape and for the charging of the slave tape, by arranging such that said capstan 31 may be shiftable between two positions.

Figure 10:
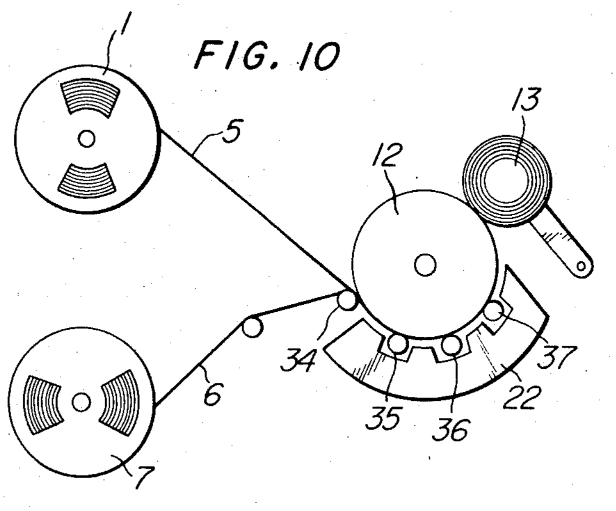
FIG. 10 is a plan view showing the fourth embodiment of the invention.

Still another embodiment of the present invention is shown in FIG. 10. In this embodiment, a plurality of pinch rollers 34, 35, 36 and 37 are arranged peripherally of the capstan 12 to drive the tape while simultaneously guiding the same. By sticking the slave tape 6 into the nip between the pinch roller 34 and the capstan 12, it can be automatically wound on the take-up reel 13.

Figure 11:
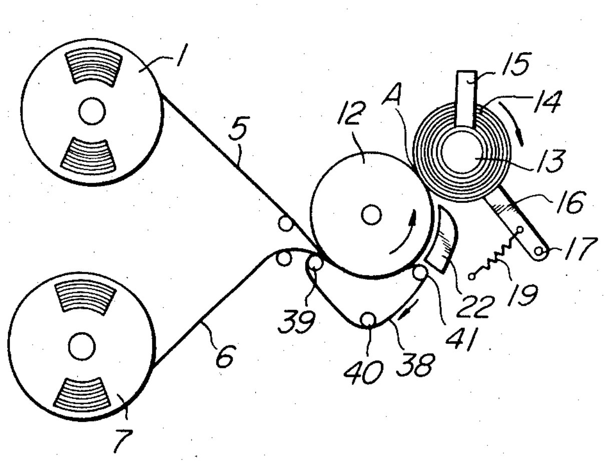
FIG. 11 is a plan view showing the fifth embodiment of the invention.

In still another embodiment of the invention shown in FIG. 11, an endless belt 38, engaged around rotating rollers 39, 40 and 41, is provided adjacent to the point where the master tape 5 is brought into contact with the capstan 12, in pressure engagement with said capstan 12 over a predetermined circumferential length of the latter. Reference numeral 22 designates a guide provided between the belt 38 and the take-up reel 13. In operation, the leading end of the slave tape 6 is inserted between the capstan 12 and the belt 38, and thereafter the capstan 12 is driven, whereupon the slave tape 6 is forwarded by the coaction of the capstan 12 and the belt 38 in pressure engagement with each other, and the leading end thereof is led to the point A by being guided by the guide 22.

In the foregoing description on the embodiments of the invention, means for automatically winding the master tape 5 on the take-up reel 13 and means for automatically winding the slave tape 6 on said take-up reel after the master tape has been engaged around the take-up reel have been explained. It will be understood, however, that in the case wherein the third tape is simultaneously taken up on the take-up reel to be interposed between adjacent turns of the master tape and the slave tape for the purpose of preventing the signal on one turn of the master tape from being transferred onto the turns of the slave tape beyond the turn adjacent to said turn of the master tape, upon impression of a transfer magnetic field, the slave tape and said third tape or the master tape can similarly be taken up automatically, if the master tape or the third tape is engaged around the take-up reel prior to the winding operation.

Although in the embodiments described and illustrated herein, the relative position of the master tape and the slave tape is defined by the annular groove formed in the peripheral surface of the capstan, it is to be noted that such annular groove becomes unnecessary if a post is provided before the capstan to define such a relative position. In this case, the rubber or synthetic layer may be attached directly to the peripheral surface of the capstan by baking or an equivalent method, without forming the annular groove, and accordingly the guide 22 takes a different shape from that shown in FIG. 4.

What is claimed is:

1. A magnetic tape duplicating apparatus comprising:

first and second tape supply reels for supplying a recorded master tape and an unrecorded slave tape, respectively;

a take-up reel on which said master and slave tapes are wound together, said take-up reel having means for securing to said take-up reel the leading end of the one of said master and slave tapes which is fed to said take-up reel first;

means for driving said take-up reel in a tape winding operation, including a rotary member biased into operative engagement with said take-up reel, wherein said master and slave tapes are trained at least partially around said rotary member between said supply reels and said take-up reel;

guide means for guiding said tapes at least partially around said rotary member to a point of operative engagement of said rotary member and said take-up reel, wherein the leading end of the one of said master and slave tapes is guided first and then the leading end of the other tape is guided to said point of operative engagement thereby to render the leading end of said the other tape to be pinched between said one tape on said take-up reel and said one tape on said rotary member; and means, including a transfer field generator mounted adjacent said take-up reel, for applying a transfer magnetic field to the portion of said tapes wound on said take-up reel to impress the signal recorded on said master tape onto said slave tape.

2. A magnetic tape duplicating apparatus as defined in claim 1, wherein said take-up reel comprises a hub portion and wherein said means for securing the leading end of said one of said tapes to said take-up reel comprises a plurality of substantially radial air passages extending inwardly from the peripheral surface of said hub and a pump communicating with said passages, wherein, by the operation of said pump, a partial vacuum is created at said peripheral surface adjacent said passages.

3. A magnetic tape duplicating apparatus as defined in claim 1, wherein said take-up reel comprises a hub portion and wherein said means for securing the leading end of said one of said tapes to said take-up reel comprises a tacky layer provided on the peripheral surface of said hub, said tacky layer being substantially non-transferable to said tapes.

4. A magnetic tape duplicating apparatus as defined in claim 1, wherein said rotary element has an annular groove formed in the peripheral surface thereof to restrict a widthwise displacement of the tape by the upper and lower edges of said groove and the inside surface of said groove is coated with a layer of rubber or synthetic resin, and further comprising means for forwarding and guiding the leading end of the first fed tape, including a guiding member comprising a block fitted to the contour of said groove and located adjacent to but spaced from said groove of said rotary member.

5. A magnetic tape duplicating apparatus as defined in claim 1, wherein an endless belt is provided in pressure engagement with the rotary member for forwarding and guiding the leading end of the first fed tape to the point of engagement between said rotary member and the take-up reel.

6. A magnetic tape duplicating apparatus as defined in claim 1, wherein at least one rotary roller is provided in pressure contact with said rotary member for forwarding and guiding the leading end of the first fed tape to the point of engagement between said rotary member and the take-up reel.

* * * * *